United States Patent
Xu

(10) Patent No.: US 11,374,316 B2
(45) Date of Patent: Jun. 28, 2022

(54) BASE STATION ANTENNAS WITH REMOTE ELECTRONIC TILT ACTUATORS FOR CONTROLLING MULTIPLE PHASE SHIFTERS

(71) Applicant: CommScope Technologies LLC, Hickory, NC (US)

(72) Inventor: HanXing Xu, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 324 days.

(21) Appl. No.: 16/862,812

(22) Filed: Apr. 30, 2020

(65) Prior Publication Data
US 2020/0373663 A1   Nov. 26, 2020

(30) Foreign Application Priority Data

May 21, 2019   (CN) .......................... 201910423143.6

(51) Int. Cl.
| | |
|---|---|
| H01Q 3/30 | (2006.01) |
| H01Q 3/32 | (2006.01) |
| H01Q 3/26 | (2006.01) |
| B60N 2/02 | (2006.01) |
| H01Q 3/38 | (2006.01) |
| H01P 1/18 | (2006.01) |

(52) U.S. Cl.
CPC ............. *H01Q 3/32* (2013.01); *B60N 2/0232* (2013.01); *B60N 2/0296* (2013.01); *H01P 1/184* (2013.01); *H01Q 3/2688* (2013.01); *H01Q 3/38* (2013.01); *B60N 2002/0236* (2013.01)

(58) Field of Classification Search
CPC .......... H01Q 3/32; H01Q 3/2688; H01Q 3/38; B60N 2/0232; B60N 2/0296; B60N 2002/0236; H01P 1/184
See application file for complete search history.

(56) References Cited

U.S. PATENT DOCUMENTS

| | | |
|---|---|---|
| 7,907,096 B2 | 3/2011 | Timofeev et al. |
| 2013/0307728 A1 | 11/2013 | Berger et al. |
| 2017/0365923 A1* | 12/2017 | Schmutzler ............ H01Q 3/005 |

* cited by examiner

*Primary Examiner* — Dinh T Le
(74) *Attorney, Agent, or Firm* — Myers Bigel, P.A.

(57) ABSTRACT

The present invention relates to base station antennas having remote electronic tilt capabilities. Actuators for multiple phase shifters are described herein. An actuator may include a motor, a linkage drive system including a plurality of drive mechanisms for driving mechanical linkages of multiple phase shifters, a linkage selection system that is configured to selectively connect the motor to a selected one of the drive mechanisms of the linkage drive system. The linkage selection system may include a support seat, a carrier disposed on the support seat, and a movement transmission mechanism.

19 Claims, 7 Drawing Sheets

BASE STATION ANTENNAS WITH REMOTE ELECTRONIC TILT ACTUATORS FOR CONTROLLING MULTIPLE PHASE SHIFTERS

RELATED APPLICATION(S)

The present application claims priority from and the benefit of Chinese Patent Application No. 201910423143.6, filed May 21, 2019, the disclosure of which is hereby incorporated herein in its entirety.

FIELD

The present invention relates to communication systems and, in particular, to base station antennas having remote electronic tilt capabilities.

BACKGROUND

Cellular communications systems are used to provide wireless communications to fixed and mobile subscribers (herein "users"). A cellular communications system may include a plurality of base stations that each provides wireless cellular service for a specified coverage area that is typically referred to as a "cell." Each base station may include one or more base station antennas that are used to transmit radio frequency ("RF") signals to, and receive RF signals from, the users that are within the cell served by the base station. Base station antennas are directional devices that can concentrate the RF energy that is transmitted in certain directions (or received from those directions). The "gain" of a base station antenna in a given direction is a measure of the ability of the antenna to concentrate the RF energy in that particular direction. The "radiation pattern" of a base station antenna is compilation of the gain of the antenna across all different directions. The radiation pattern of a base station antenna is typically designed to service a pre-defined coverage area such as the cell or a portion thereof that is typically referred to as a "sector." The base station antenna may be designed to have minimum gain levels throughout its pre-defined coverage area, and it is typically desirable that the base station antenna have much lower gain levels outside of the coverage area to reduce interference between sectors/cells. Early base station antennas typically had a fixed radiation pattern, meaning that once a base station antenna was installed, its radiation pattern could not be changed unless a technician physically reconfigured the antenna. Unfortunately, such manual reconfiguration of base station antennas after deployment, which could become necessary due to changed environmental conditions or the installation of additional base stations, was typically difficult, expensive and time-consuming.

More recently, base station antennas have been deployed that have radiation patterns that can be reconfigured from a remote location by transmitting control signals to the antenna. Base station antennas having such capabilities are typically referred to as remote electronic tilt ("RET") antennas. The most common changes to the radiation pattern are changes in the down tilt angle (i.e., the elevation angle) and/or the azimuth angle. RET antennas allow wireless network operators to remotely adjust the radiation pattern of the antenna by transmitting control signals to the antenna that electronically alter the RF signals that are transmitted and received by the antenna.

Base station antennas typically comprise a linear array or a two-dimensional array of radiating elements such as patch, dipole or crossed dipole radiating elements. In order to electronically change the down tilt angle of these antennas, a phase taper may be applied across the radiating elements of the array, as is well understood by those of skill in the art. Such a phase taper may be applied by adjusting the settings on an adjustable phase shifter that is positioned along the RF transmission path between a radio and the individual radiating elements of the base station antenna. One widely-used type of phase shifter is an electromechanical "wiper" phase shifter that includes a main printed circuit board and a "wiper" printed circuit board that may be rotated above the main printed circuit board. Such wiper phase shifters typically divide an input RF signal that is received at the main printed circuit board into a plurality of sub-components, and then capacitively couple at least some of these sub-components to the wiper printed circuit board.

The sub-components of the RF signal may be capacitively coupled from the wiper printed circuit board back to the main printed circuit board along a plurality of arc-shaped traces, where each arc has a different diameter. Each end of each arc-shaped trace may be connected to a radiating element or to a sub-group of radiating elements. By physically (mechanically) rotating the wiper printed circuit board above the main printed circuit board, the locations where the sub-components of the RF signal capacitively couple back to the main printed circuit board may be changed, which thus changes the length of the respective transmission path from the phase shifter to an associated radiating element for each sub-component of the RF signal. The changes in these path lengths result in changes in the phases of the respective sub-components of the RF signal, and since the arcs have different radii, the phase changes along the different paths will be different. Thus, the above-described wiper phase shifters may be used to apply a phase taper to the sub-components of an RF signal that are applied to each radiating element (or sub-group of radiating elements). Exemplary phase shifters of this variety are discussed in U.S. Pat. No. 7,907,096 to Timofeev, the disclosure of which is hereby incorporated herein in its entirety. The wiper printed circuit board is typically moved using an electromechanical actuator such as a DC motor that is connected to the wiper printed circuit board via a mechanical linkage. These actuators are often referred to as RET actuators since they are used to apply the remote electronic down tilt.

Modern base station antennas often include two, three or more linear arrays of radiating elements. If the linear arrays include cross-polarized radiating elements, then a separate phase shifter is provided for each polarization (i.e., two phase shifters per linear array). Moreover, separate transmit and receive phase shifters are often provided for each linear array so that the transmit and receive radiation patterns may be independently adjusted, which may again double the number of phase shifters. Additionally, in some cases, some (or all) of the linear arrays may be formed using wideband radiating elements that support service in multiple frequency bands (e.g., the 700 MHz and 800 MHz frequency bands or two or more frequency bands within the 1.7-2.7 GHz frequency range). When such wideband linear arrays are used, separate phase shifters may be provided for each frequency band within the broader operating frequency range of the radiating elements. Since base station antennas with two to as many as eight linear arrays of cross-polarized radiating elements are being deployed, it is not uncommon for a base station antenna to have eight, twelve or even twenty-four adjustable phase shifters for applying remote electronic down tilts to the linear arrays.

As described above, RET actuators are provided in the antenna that are used to move elements on the phase shifters to adjust the down tilt angle of the antenna beams formed by the various linear arrays. While the same down tilt is typically applied to the phase shifters for the two different polarizations, allowing a single RET actuator and a single mechanical linkage to be used to adjust the phase shifters for both polarizations, modern base station antennas still often need four, six, twelve or even more RET actuators. Such large numbers of RET actuators and associated mechanical linkages can significantly increase the size, weight and cost of a base station antenna.

Conventionally, a separate RET actuator was provided for each phase shifter (or each pair of phase shifters if dual polarized radiating elements are used in a linear array). More recently, RET actuators have been proposed that may be used to move the wiper printed circuit board on as many as twelve phase shifters. For example, U.S. Patent Publication No. 2013/0307728 ("the '728 publication") discloses a RET actuator that may be used to drive six different mechanical linkages for purposes of adjusting six (or twelve) different phase shifters using one so-called "multi-RET actuator." U.S. Patent Publication No. 2017/0365923 ("the '923 publication") discloses a number of additional multi-RET actuator designs.

As more complex base station antennas are introduced, requiring ever increasing numbers of independently controlled phase shifters, it can become difficult to design base station antennas that fit within customer-demanded limitations on the size of the antenna. While conventional multi-RET actuators occupy less volume within the antenna than the total volume occupied by the individual RET actuators that they replace, conventional multi-RET actuators tend to be large and cumbersome, and hence may be difficult to fit within some antenna designs. It can also be difficult to accommodate multiple multi-RET actuators within base station antenna designs, which is sometimes required.

SUMMARY

One of the objects of the present invention is to provide a multi-RET actuator that is capable of overcoming at least one of the defects in the prior art.

Embodiments of the present invention are directed to an actuator for multiple phase shifters. The actuator may include a motor, a linkage drive system including a plurality of drive mechanisms for driving mechanical linkages of multiple phase shifters, a linkage selection system that is configured to selectively connect the motor to a selected one of the drive mechanisms of the linkage drive system. The linkage selection system may include a support seat having a length direction that is transverse to a length direction of the mechanical linkage, a carrier disposed on the support seat and configured to carry the motor back and forth along a length direction of the support seat, and a movement transmission mechanism that is configured to switch between a movement state in which the movement transmission mechanism is configured to move the carrier and the motor to a position where an output of the motor can engage the selected one of the driving mechanisms, and a transmission state in which the movement transmission mechanism transfers a rotational movement of the output of the motor to the selected one of the drive mechanisms.

In some embodiments, the linkage selection system further includes a state changeover switch that is configured to switches the movement transmission mechanism between the movement state and the transmission state.

In some embodiments, the state changeover switch is a solenoid valve or a motor.

In some embodiments, the movement transmission mechanism includes a rack, a gear train that is configured to selectively mesh with the rack, and an output shaft of the movement transmission mechanism connected to the gear train.

In some embodiments, the rack is fixed to the support seat and extends along a length direction of the support seat.

In some embodiments, the gear train is mounted on one side of the carrier proximate the mechanical linkages, and the motor and the state changeover switch are mounted on another side of the carrier that is away from the mechanical linkages.

In some embodiments, the gear train includes a first gear that is directly connected to an output shaft of the motor and a second gear that is directly connected to an output shaft of the state changeover switch, wherein the first gear and the second gear are directly engaged or are engaged through one or more intermediate gears.

In some embodiments, the second gear remains engaged with both the first gear and the rack when the state changeover switch is in the movement state, and remains engaged with the first gear and disengaged from the rack when the state changeover switch is in the transmission state.

In some embodiments, the first gear and the second gear are both spur gears.

In some embodiments, the output shaft of the movement transmission mechanism is coaxially fixed to a center of the second gear.

In some embodiments, the support seat includes one or more guide rods and a base that supports the guide rods.

In some embodiments, the carrier spans the guide rod, and is configured for movement back and forth in a length direction of the support seat along the guide rod.

In some embodiments, the base includes a bottom plate fixed to a substrate of the actuator, and projecting arms projecting upwardly from both ends of the bottom plate and supporting the guide rod.

In some embodiments, the projecting arms support the guide rod above the substrate on both ends of the guide rod.

In some embodiments, the linkage drive system includes a support seat and a plurality of lead screws supported on the support seat.

In some embodiments, each lead screw is provided with a drive block for driving a reciprocal movement of the mechanical linkages, and each drive block is engaged with an external thread of a respective one of the lead screws by internal threads.

In some embodiments, each lead screw is provided with a connection portion on an end facing the linkage selection system that is configured to connect with an output shaft of the linkage selection system.

In some embodiments, the connection portion has a recess for receiving a top end of the output shaft of the linkage selection system, and the recess has a cross-sectional profile that matches a cross-sectional profile of the top end of the output shaft of the linkage selection system.

In some embodiments, the actuator includes a controller that is configured to control operation of the motor and operation of the state changeover switch.

BRIEF DESCRIPTION OF THE DRAWINGS

After reading the embodiments hereinafter in combination with the drawings, a plurality of aspects of the present invention will be better understood.

DETAILED DESCRIPTION

Figure 1A:
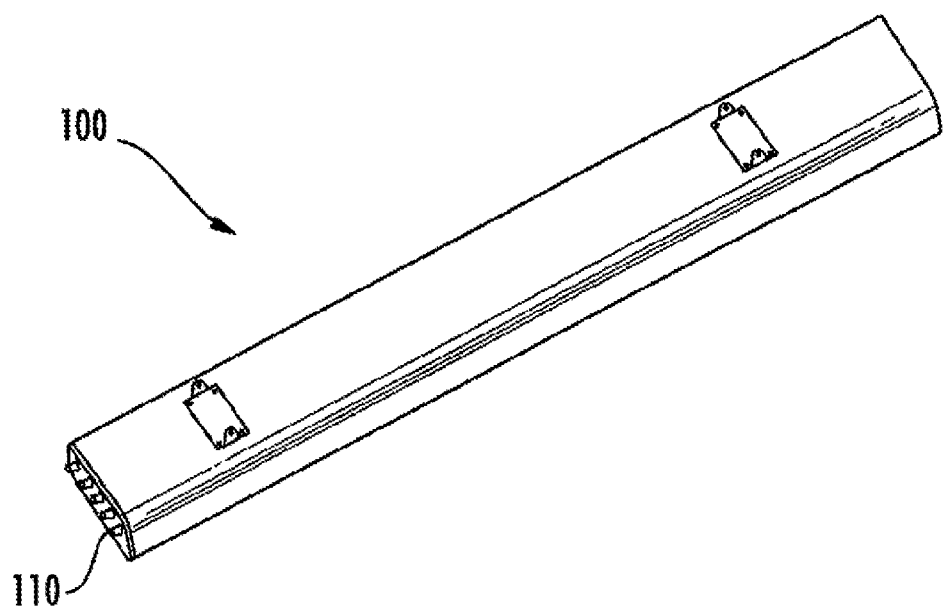
FIG. 1A is a perspective view of an example base station antenna according to embodiments of the present invention.

The present disclosure will be described below with reference to the drawings, in which several embodiments of the present disclosure are shown. It should be understood, however, that the present disclosure may be presented in multiple different ways, and not limited to the embodiments described below. In fact, the embodiments described hereinafter are intended to make a more complete disclosure of the present disclosure and to adequately explain the protection scope of the present disclosure to a person skilled in the art. It should also be understood that, the embodiments disclosed herein can be combined in various ways to provide more additional embodiments.

It should be understood that, in all the drawings, the same reference signs present the same elements. In the drawings, for the sake of clarity, the sizes of certain features may be altered.

It should be understood that, the wording in the specification is only used for describing particular embodiments and is not intended to define the present disclosure. All the terms used in the specification (including the technical terms and scientific terms), have the meanings as normally understood by a person skilled in the art, unless otherwise defined. For the sake of conciseness and/or clarity, the well-known functions or constructions may not be described in detail any longer.

The singular forms "a/an", "said" and "the" as used in the specification, unless clearly indicated, all contain the plural forms. The wordings "comprising", "containing" and "including" used in the specification indicate the presence of the claimed features, but do not repel the presence of one or more other features. The wording "and/or" as used in the specification includes any and all combinations of one or more of the relevant items listed. The phases "between X and Y" and "between about X and Y" as used in the specification should be construed as including X and Y. The phrase "between about X and Y" as used in the present specification means "between about X and about Y", and the phrase "from about X to Y" as used in the present specification means "from about X to about Y".

In the specification, when one element is referred to as being "on" another element, "attached to" another element, "connected to" another element, "coupled to" another element, or "in contact with" another element, the element may be directly located on another element, attached to another element, connected to another element, coupled to another element, or in contact with another element, or there may be present with an intermediate element. By contrast, where one element is referred to as being "directly" on another element, "directly attached to" another element, "directly connected to" another element, "directly coupled to" another element, or "in direct contact with" another element, there will not be present with an intermediate element. In the specification, where one feature is arranged to be "adjacent" to another feature, it may mean that one feature has a portion that overlaps with an adjacent feature or a portion that is located above or below an adjacent feature.

In the specification, the spatial relation wordings such as "up", "down", "left", "right", "forth", "back", "high", "low" and the like may describe a relation of one feature with another feature in the drawings. It should be understood that, the spatial relation wordings also contain different orientations of the apparatus in use or operation, in addition to containing the orientations shown in the drawings. For example, when the apparatus in the drawings is overturned, the features previously described as "below" other features may be described to be "above" other features at this time. The apparatus may also be otherwisely oriented (rotated 90 degrees or at other orientations). At this time, the relative spatial relations will be explained correspondingly.

Figure 1B:
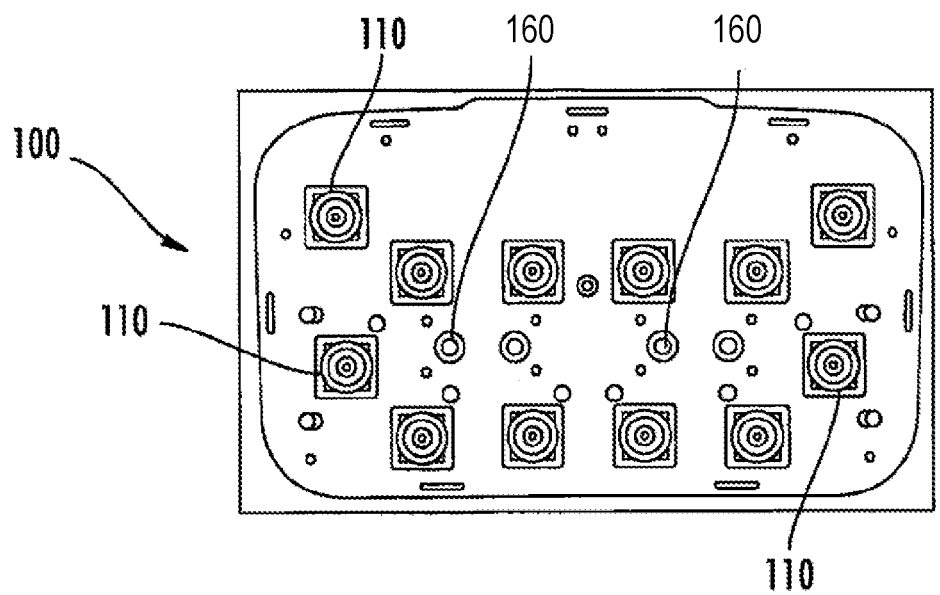
FIG. 1B is an end view of the base station antenna of FIG. 1A.
Figure 1C:
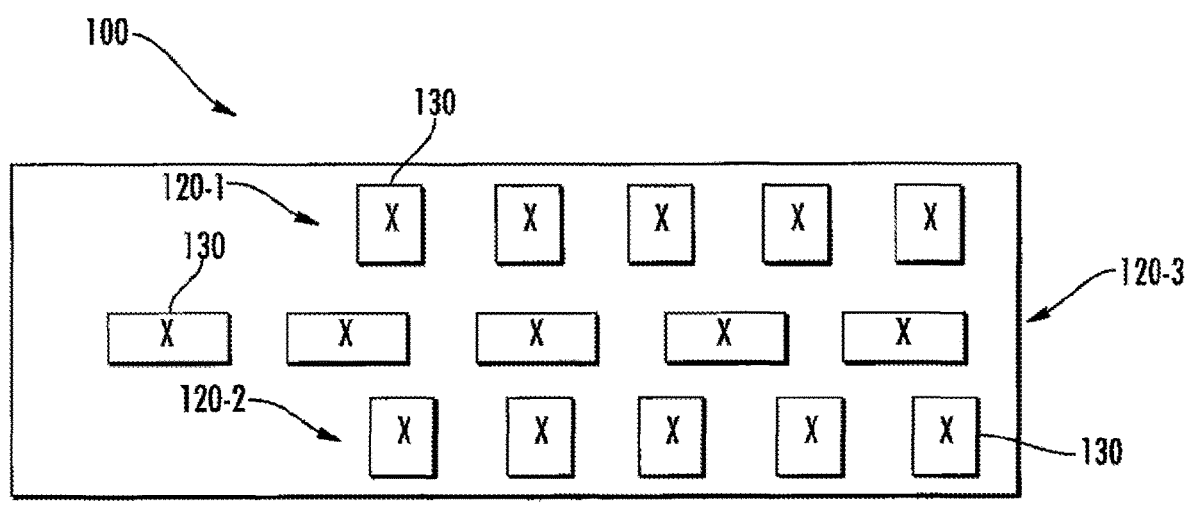
FIG. 1C is a schematic plan view of the base station antenna of FIG. 1A that illustrates the three linear arrays of radiating elements thereof.
Figure 2:
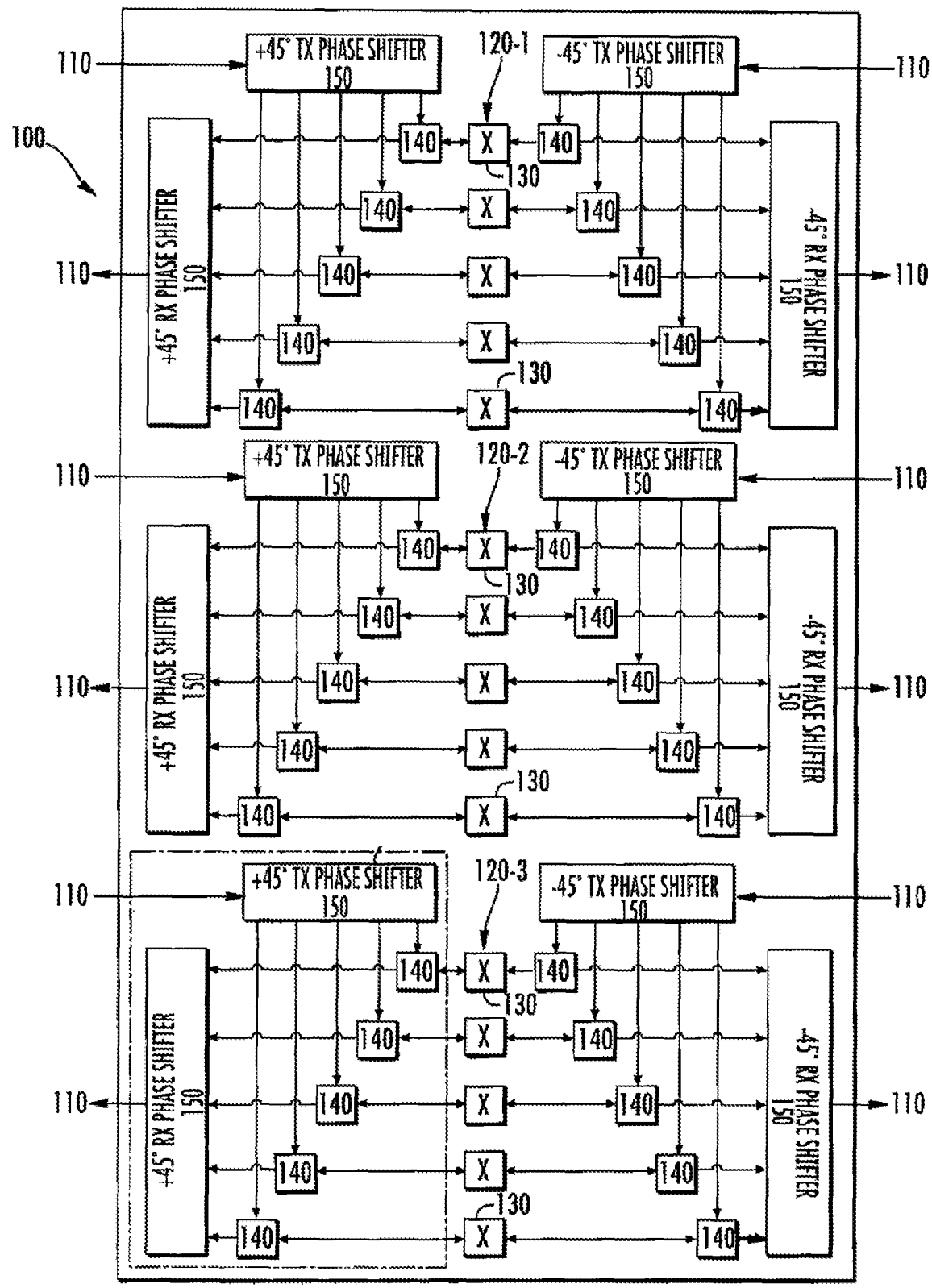
FIG. 2 is a schematic block diagram illustrating the electrical connections between various components of the base station antenna of FIGS. 1A-1C.

Embodiments of the present invention will now be discussed in greater detail with reference to the drawings. FIG. 1A is a perspective view of a base station antenna 100 that may include one or more of the multi-RET actuators according to embodiments of the present invention. FIG. 1B is an end view of the base station antenna 100 that illustrates the input/output ports thereof. FIG. 1C is a schematic plan view of the base station antenna 100 that illustrates the three linear arrays of radiating elements thereof. FIG. 2 is a schematic block diagram illustrating various components of the base station antenna 100 and the electrical connections therebetween. It should be noted that FIG. 2 does not show the actual location of the various elements on the antenna, but instead is drawn to merely show the electrical transmission paths between the various elements.

Referring to FIGS. 1A-1C and FIG. 2, the base station antenna 100 includes, among other things, input/output ports 110, a plurality of linear arrays 120 of radiating elements 130, duplexers 140, phase shifters 150 and control ports 160. As shown in FIG. 1C and FIG. 2, the base station antenna 100 includes a total of three linear arrays 120 (labeled 120-1 through 120-3) that each include five radiating elements 130. It will be appreciated, however, that the number of linear arrays 120 and the number of radiating elements 130 included in each of the linear arrays 120 may be varied. It will also be appreciated that different linear arrays 120 may have different numbers of radiating elements 130.

Referring to FIG. 2, the connections between the input/output ports 110, radiating elements 130, duplexers 140 and phase shifters 150 are schematically illustrated. Each set of an input port 110 and a corresponding output port 110, and their associated phase shifters 150 and duplexers 140, may comprise a corporate feed network. A dashed box is used in FIG. 2 to illustrate one of the six corporate feed networks included in antenna 100. Each corporate feed network connects the first polarization radiators of the radiating elements 130 of one of the linear arrays 120 to a respective pair of input/output ports 110.

As shown schematically in FIG. 2 by the "X" that is included in each box, the radiating elements 130 may be cross-polarized radiating elements 130 such as +45°/−45° slant dipoles that may transmit and receive RF signals at two orthogonal polarizations. Any other appropriate radiating element 130 may be used including, for example, single dipole radiating elements or patch radiating elements (including cross-polarized patch radiating elements). When cross-polarized radiating elements 130 are used, two corporate feed networks may be provided per linear array 120, a first of which carries RF signals having the first polarization (e.g., +45°) between the radiating elements 130 and a first pair of input/output ports 110 and the second of which carries RF signals having the second polarization (e.g., −45°) between the radiating elements 130 and a second pair of input/output ports 110, as shown in FIG. 2.

As shown in FIG. 2, an input of each transmit ("TX") phase shifter 150 may be connected to a respective one of the input ports 110. Each input port 110 may be connected to the transmit port of a radio (not shown) such as a remote radio head. Each transmit phase shifter 150 has five outputs that are connected to respective ones of the radiating elements 130 through respective duplexers 140. The transmit phase shifters 150 may divide an RF signal that is input thereto into a plurality of sub-components and may effect a phase taper to the sub-components of the RF signal that are provided to the radiating elements 130. In a typical implementation, a linear phase taper may be applied to the radiating elements 130. As an example, the first radiating element 130 in a linear array 120 may have a phase of $Y°+2X°$, the second radiating element 130 in the linear array 120 may have a phase of $Y°+X°$, the third radiating element 130 in the linear array 120 may have a phase of $Y°$, the fourth radiating element 130 in the linear array 120 may have a phase of $Y°−X°$, and the fifth radiating element 130 in the linear array 120 may have a phase of $Y°−2X°$, where the radiating elements 130 are arranged in numerical order.

Similarly, each receive ("RX") phase shifter 150 may have five inputs that are connected to respective ones of the radiating elements 130 through respective duplexers 140 and an output that is connected to one of the output ports 110. The output port 110 may be connected to the receive port of a radio (not shown). The receive phase shifters 150 may effect a phase taper to the RF signals that are received at the five radiating elements 130 of the linear array 120 and may then combine those RF signals into a composite received RF signal. Typically, a linear phase taper may be applied to the radiating elements 130 as is discussed above with respect to the transmit phase shifters 150.

The duplexers 140 may be used to couple each radiating element 130 to both a transmit phase shifter 150 and to a receive phase shifter 150. As is well known to those of skill in the art, a duplexer is a three port device that (1) passes signals in a first frequency band (e.g., the transmit band) through a first port while not passing signals in a second band (e.g., a receive band), (2) passes signals in the second frequency band while not passing signals in the first frequency band through a second port thereof and (3) passes signals in both the first and second frequency bands through the third port thereof, which is often referred to as the "common" port.

As can be seen from FIG. 2, the base station antenna 100 may include a total of twelve phase shifters 150. While the two transmit phase shifters 150 for each linear array 120 (i.e., one transmit phase shifter 150 for each polarization) may not need to be controlled independently (and the same is true with respect to the two receive phase shifters 150 for each linear array 120), there still are six sets of two phase shifters 150 that should be independently controllable.

The RET actuators that are used to physically adjust the settings of the phase shifters 150 are typically spaced apart from the phase shifters 150. So-called mechanical linkages are used to transfer the motion of a RET actuator to a movable element of a phase shifter 150. Each RET actuator may be controlled to generate a desired amount of movement of an output member thereof. The movement may comprise, for example, linear movement or rotational movement. A mechanical linkage is used to translate the movement of the output member of the RET actuator to movement of a movable element of a phase shifter 150 (e.g., a wiper arm, a sliding dielectric member, etc.). The mechanical linkage may comprise, for example, one or more plastic or fiberglass rods that extend between the output member of the RET actuator and the movable element of the phase shifter 150.

Each phase shifter 150 shown in FIG. 2 may be implemented, for example, as a rotating wiper phase shifter. The phase shifts imparted by a phase shifter 150 to each sub-component of an RF signal may be controlled by a mechanical positioning system that physically changes the position of the rotating wiper of each phase shifter 150, as will be explained with reference to FIG. 3.

Figure 3:
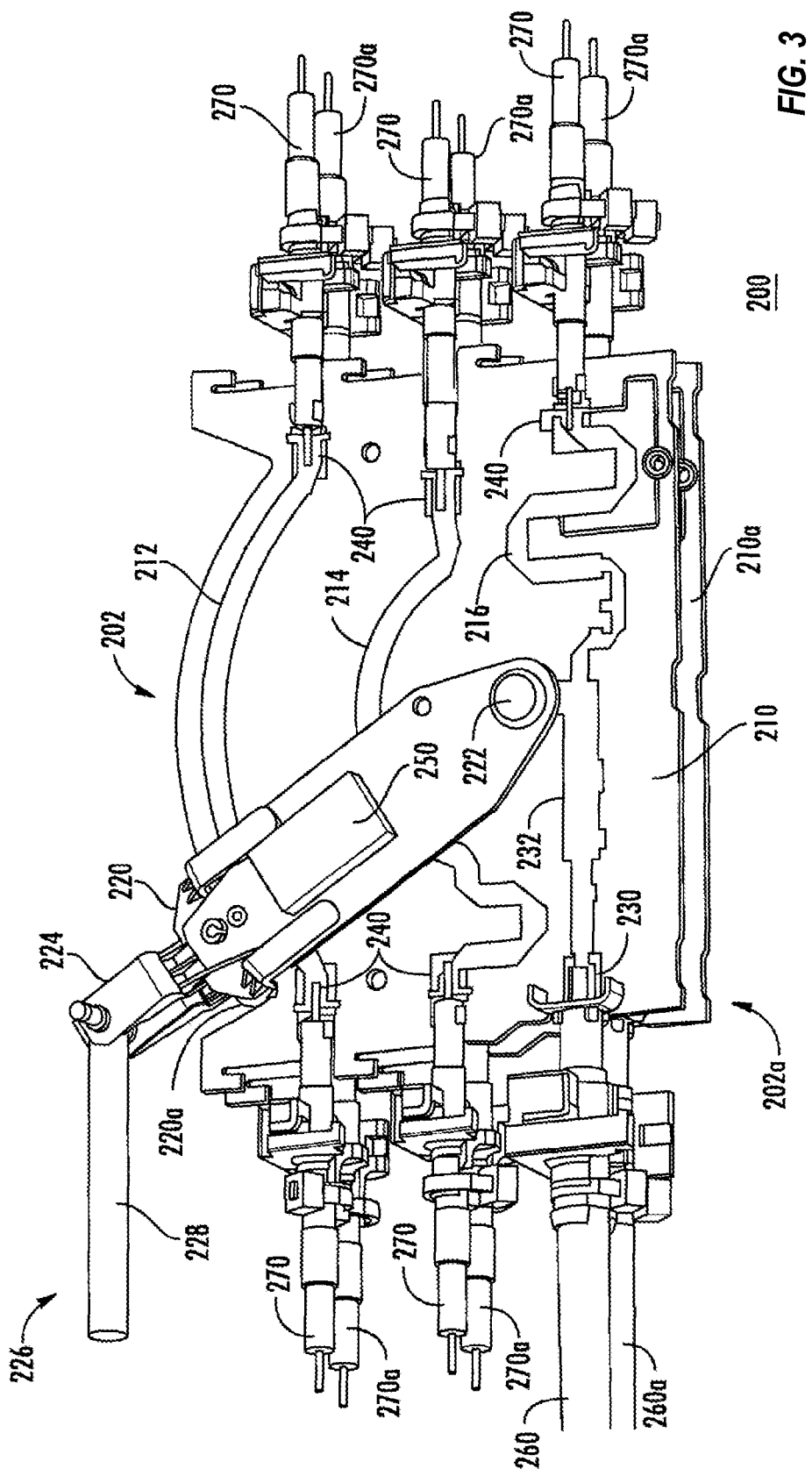
FIG. 3 is a front perspective view of a pair of electromechanical phase shifters that may be included in the base station antenna of FIGS. 1A-1C.

Referring to FIG. 3, a dual rotating wiper phase shifter assembly 200 is illustrated that may be used to implement, for example, two of the phase shifters 150 of FIG. 2 (one for each of the two polarizations). The dual rotating wiper phase shifter assembly 200 includes first and second phase shifters 202, 202a. In the description of FIG. 3 that follows it is assumed that the two phase shifters 202, 202a are each transmit phase shifters that have one input and five outputs. It will be appreciated that if the phase shifters 202, 202a are instead used as receive phase shifters then the terminology changes, because when used as receive phase shifters there will be five inputs and a single output.

As shown in FIG. 3, the dual phase shifter 200 includes first and second main (stationary) printed circuit boards 210, 210a that are arranged back-to-back as well as first and second rotatable wiper printed circuit boards 220, 220a (wiper printed circuit board 220a is barely visible in the view of FIG. 3) that are rotatably mounted on the respective main printed circuit boards 210, 210a. The wiper printed circuit boards 220, 220a may be pivotally mounted on the respective main printed circuit boards 210, 210a via a pivot pin 222. The wiper printed circuit boards 220, 220a may be joined together at their distal ends via a bracket 224.

The position of each rotatable wiper printed circuit boards 220, 220a above its respective main printed circuit board 210, 210a is controlled by the position of a mechanical linkage 170 (partially shown in FIG. 3) that extends between a linkage drive system of a RET actuator and the phase shifter 200.

Each main printed circuit board 210, 210a includes transmission line traces 212, 214. The transmission line traces 212, 214 are generally arcuate. In some cases the arcuate transmission line traces 212, 214 may be disposed in a serpentine pattern to achieve a longer effective length. In the example illustrated in FIG. 3, there are two arcuate transmission line traces 212, 214 per main printed circuit board 210, 210a (the traces on printed circuit board 210a are not visible in FIG. 3), with the first arcuate transmission line trace 212 being disposed along an outer circumference of each printed circuit board 210, 210a, and the second arcuate transmission line trace 214 being disposed on a shorter radius concentrically within the outer transmission line trace 212. A third transmission line trace 216 on each main printed circuit board 210, 210a connects an input pad 230 on each main printed circuit board 210, 210a to an output pad 240 that is not subjected to an adjustable phase shift.

The main printed circuit board 210 includes one or more input traces 232 leading from the input pad 230 near an edge of the main printed circuit board 210 to the position where the pivot pin 222 is located. RF signals on the input trace 232 are coupled to a transmission line trace (not visible in FIG. 3) on the wiper printed circuit board 220, typically via a capacitive connection. The transmission line trace on the wiper printed circuit board 220 may split into two secondary transmission line traces (not shown). The RF signals are capacitively coupled from the secondary transmission line traces on the wiper printed circuit board 220 to the transmission line traces 212, 214 on the main printed circuit board. Each end of each transmission line trace 212, 214 may be coupled to a respective output pad 240. A coaxial cable 260 or other RF transmission line component may be connected to input pad 230. A respective coaxial cable 270 or other RF transmission line component may be connected to each respective output pad 240. As the wiper printed circuit board 220 moves, an electrical path length from the input pad 230 of phase shifter 202 to each radiating element 230 served by the transmission lines 212, 214 changes. For example, as the wiper printed circuit board 220 moves to the left it shortens the electrical length of the path from the input pad 230 to the output pad 240 connected to the left side of transmission line trace 212 (which connects to a first radiating element 130), while the electrical length from the input pad 230 to the output pad 240 connected to the right side of transmission line trace 212 (which connects to a second radiating element) increases by a corresponding amount. These changes in path lengths result in phase shifts to the signals received at the output pads 240 connected to transmission line trace 212 relative to, for example, the output pad 240 connected to transmission line trace 216.

The second phase shifter 202a may be identical to the first phase shifter 202. As shown in FIG. 3, the rotating wiper printed circuit board 220a of phase shifter 202a may be controlled by the same drive shaft 172 of the mechanical linkage 170 as the rotating wiper printed circuit board 220 of phase shifter 202. For example, if a linear array 120 includes dual polarized radiating elements 130, typically the same phase shift will be applied to the RF signals transmitted at each of the two orthogonal polarizations. In this case, a single mechanical linkage 170 may be used to control the positions of the wiper printed circuit boards 220, 220a on both phase shifters 202, 202a.

Figure 4:
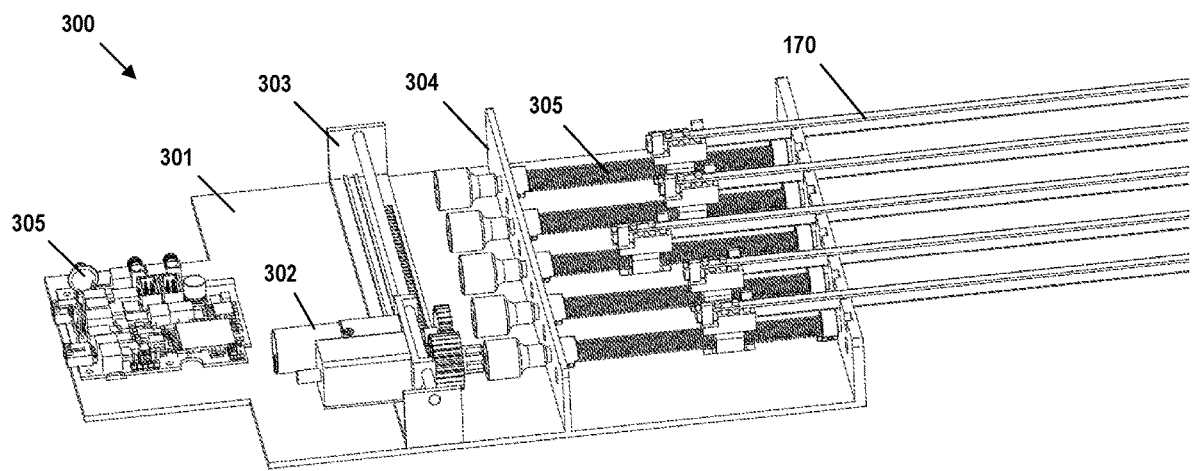
FIG. 4 is a perspective view of a multi-RET actuator according to embodiments of the present invention.
Figure 5:
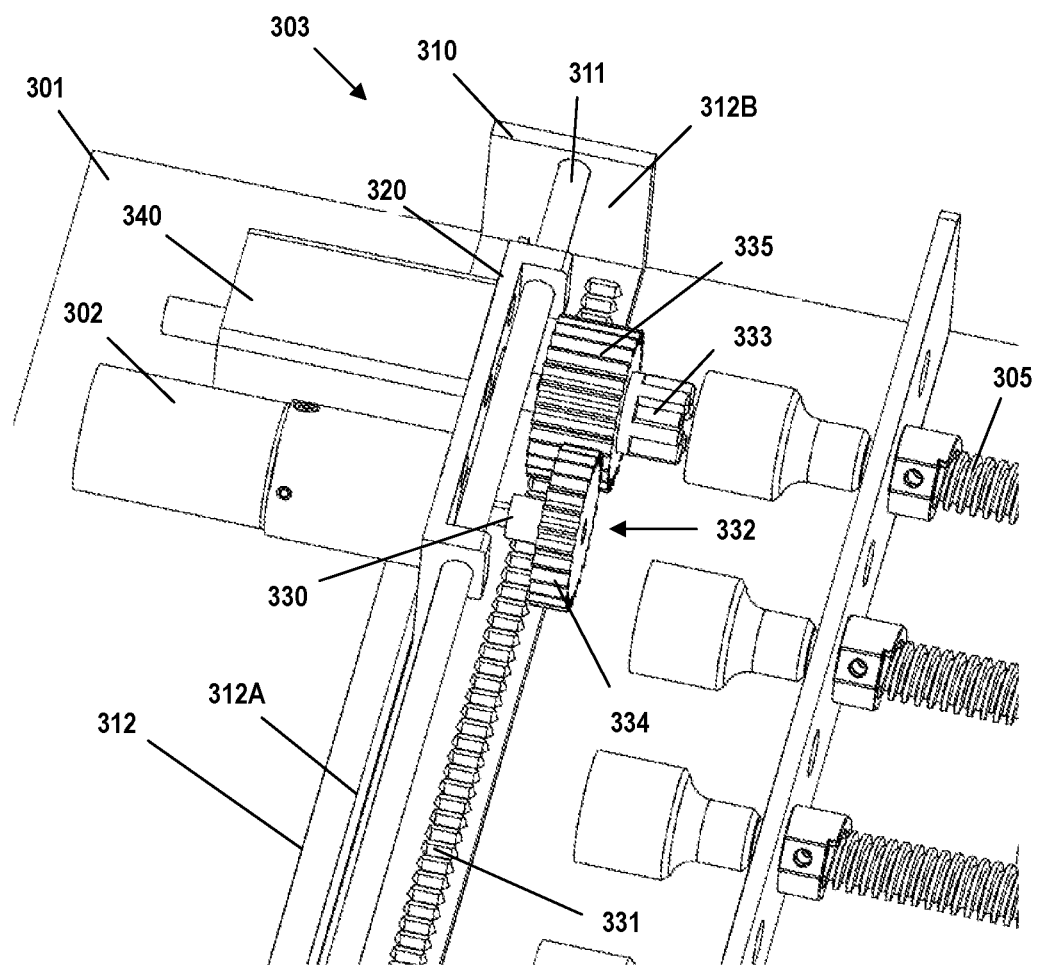
FIG. 5 is a perspective view of the linkage selection system of the multi-RET actuator of FIG. 4.
Figure 6:
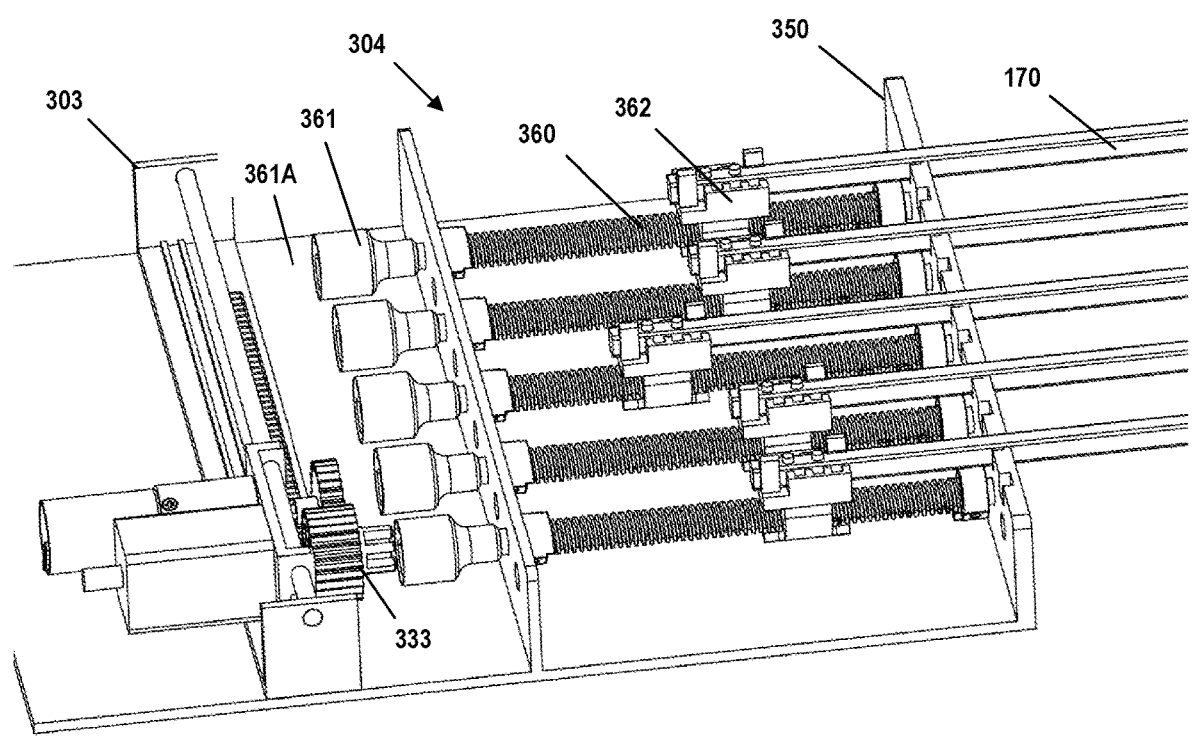
FIG. 6 is a perspective view of the linkage drive system of the multi-RET actuator of FIG. 4.

The multi-RET actuator 300 according to embodiments of the present disclosure will be described below in conjunction with FIGS. 4-6. FIG. 4 is a perspective view of the multi-RET actuator 300 according to embodiments of the present invention. FIG. 5 is a perspective view of the linkage selection system 303 of the multi-RET actuator 300. FIG. 6 is a perspective view of the linkage drive system 304 of the multi-RET actuator 300.

FIG. 4 illustrates a multi-RET actuator 300 for a base station antenna, such as base station antenna 100, according to embodiments of the present disclosure. As shown, the actuator 300 comprises a base plate 301, and a motor 302 disposed on the base plate 301, a linkage selection system 303, and a linkage drive system 304. The linkage drive system 304 includes a plurality of drive mechanisms 305 corresponding to the mechanical linkages 170 in number, so as to drive a plurality of mechanical linkages 170 respectively. The motor 302 may be selectively connected to one of the drive mechanisms 305 of the linkage drive system 304 using the linkage selection system 303, so as to drive the mechanical linkage 170 associated with the selected drive mechanism 305.

FIG. 5 illustrates a linkage selection system 303 of a multi-RET actuator 300 according to embodiments of the present disclosure. As shown, the linkage selection system 303 includes a support seat 310, a carrier 320, a movement transmission mechanism 330, and a state changeover switch 340. The support seat 310 has a length direction that may be transverse to a length direction of the mechanical linkage 170, and in one embodiment substantially perpendicular to a length direction of the mechanical linkage 170. The carrier 320 is disposed on the support seat 310, and is movable back and forth along a length direction of the support seat 310 by an output of the drive of the motor 302. The carrier 320 carries the motor 302, the movement transmission mechanism 330, and the state changeover switch 340. The movement transmission mechanism 330 is switched between a movement state and a transmission state by the state changeover switch 340. When in the movement state, the movement transmission mechanism 330 moves the motor 302 to a position adjacent a selected one of the drive mechanisms 305; when in the transmission state, the movement transmission mechanism 330 transfers the output of the motor 302 (i.e., a rotational motion of an output shaft of the motor) to the selected drive mechanism 305. The state changeover switch 340 may be, for example, a solenoid valve or another motor.

In one embodiment, the support seat 310 includes one or more guide rods 311 and a base 312 that supports the guide rods 311. In an example embodiment, the base 312 may include a bottom plate 312A and projecting arms 312B that projects vertically upward from both ends of the bottom plate 312A. The bottom plate 312A may be integrally molded with the projecting arms 312B, or may be separately molded and connected together in any known manner such as welding, adhesion, riveting, screws, and the like. The bottom plate 312A is fixed to the substrate 301 by welding, screws or the like. In some embodiments, the base 312 may be integral with the substrate 301 so that the bottom plate 312A is a portion of the substrate 301 and the projecting arms 312B project upwardly from the substrate 301. The projecting arms 312B support the guide rod 311 above the substrate 301 on, for example, both ends of the guide rod 311. In the case where there are a plurality of guide rods 312, the guide rods 312 may, for example, be arranged along a vertical direction that is perpendicular to the substrate 301, in a horizontal direction that is parallel to the substrate 301, or both along a vertical direction and a horizontal direction.

The carrier 320 spans over the guide rod 311, and is movable back and forth in a length direction of the support seat 310 along the guide rod 311 by the drive of the motor 302. The motor 302 and the state changeover switch 340 are mounted on one side of the carrier 320 away from mechanical linkage 170, while most of the components of the movement transmission mechanism 330 may be mounted on another side of the carrier 320 that is proximate the mechanical linkage 170. The movement transmission mechanism 330 includes an elongated rack 331, a gear train 332 located above the rack 331, and an output shaft 333 that is connected to the gear train 332. The rack 331 may be fixed, for example, to the bottom plate 312A of the support seat 310 and disposed along a length direction of the support seat 310. The gear train 332 may include a first gear 334 that may be directly connected to the output shaft of the motor 302, a second gear 335 that may be directly connected to the output shaft of the state changeover switch 340, and may also include one or more intermediate gears (not shown) that are located between the first gear 334 and the second gear 335 and engaged with the first gear 334 and the second gear 335. As shown in FIG. 5, the intermediate gear(s) may be omitted in some embodiments, and the first gear 334 and the second gear 335 may be directly engaged. In some embodiments, the first gear 334 and the second gear 335 are both spur gears. The output shaft 333 may be coaxially fixed to the second gear 335.

The motor 302 transfers a rotational motion of its output shaft to the first gear 334, which in turn transfers a rotational motion directly (or through the intermediate gear) to the second gear 335. The state changeover switch 340 drives the second gear 335 through its output shaft along a direction parallel to the length direction of the mechanical linkage 170, such that the second gear 335 is movable between a movement position and a transmission position along a direction parallel to the length direction of the mechanical linkage 170. The movement position of the second gear 335 is away from the mechanical linkage 170, and the transmission position is proximate to the mechanical linkage 170. Whether in the movement position or the transmission position, the second gear 335 always remains directly engaged with the first gear 334, or indirectly engaged with the first gear 334 through one or more intermediate gears. The second gear 335 is engaged with the rack 331 when in the movement position, and is not engaged with the rack 331 when in the transmission position. Specifically, when in the movement position, the second gear 335 remains directly or indirectly engaged with the first gear 334, and engaged with the rack 331, such that a rotational motion of the first gear 334 is transferred to the second gear 335 and a rotational movement of the second gear 335 drives the carrier 320 to move linearly along a length direction of the rack 331 and the support seat 310. When in the transmission position, the second gear 335 remains directly or indirectly engaged with the first gear 334, and disengaged from the rack 331, and the output shaft 333 and the linkage drive system 304 are connected together, such that a rotational movement of the first gear 334 is transferred to the second gear 335, and transferred to the linkage drive system 304 through the output shaft 333, so as to drive the mechanical linkage 170 to move.

FIG. 6 illustrates a linkage drive system 304 of the multiple RET actuator 300 according to embodiments of the present disclosure. As shown, the linkage drive system 304 is disposed between the linkage selection system 303 and the mechanical linkages 170, and drives a selected one of the mechanical linkages 170 to move.

The linkage drive system 304 includes a support seat 350 and a plurality of lead screws 360 supported on the support seat 350. The number of lead screws 360 may be the same as the number of mechanical linkages 170, and each lead screw 360 may be associated with a respective one of the mechanical linkages 170. The plurality of lead screws 360 are parallel to one another, and parallel to the associated mechanical linkages 170. Each lead screw 360 is provided with a connection portion 361 on an end facing the linkage selection system 303, for connecting to the output shaft 333 of the linkage selection system 303. In one embodiment, each connection portion 361 has a recess 361A for receiving a top end of the output shaft 333, and the recess 361A has a cross-sectional profile matching a cross-sectional profile of a top end of the output shaft 333 (e.g., in a polygonal shape, a plum shape, an oval shape and the like). A drive block 362 for driving a reciprocal movement of the mechanical linkage 170 is provided on each lead screw 360. Each drive block 362 is internally threaded, and the internal threads of each drive block are engaged with an external thread of a respective one of the lead screws 360, so that a rotational movement of the lead screw 360 drives the driving block 362 to perform a linear movement along the lead screw 360, thereby driving the mechanical linkage 170 to move linearly.

In some embodiments, a controller 305 is also provided on the substrate 301 of the actuator 300 for controlling the operations of the motor 302 and the state changeover switch 340. When it is necessary to selectively drive one of the mechanical linkages 170 during operation, the controller 305 sends a control signal to the motor 302 and the state changeover switch 340. The state changeover switch 340 drives the second gear 335 to the movement position, so as to be engaged with the rack 331. Thereafter, the motor 302 begins to drive the first gear 334 to rotate through its output shaft, thereby driving the second gear 335 to rotate. Since the second gear 335 is engaged with the rack 331 fixed on the bottom plate 312A of the support seat 310, the rotation of the second gear 335 drives the carrier 320 to move to a front of the lead screw 360 associated with the desired mechanical linkage 170 along the guide rod 312. Afterwards, the motor 320 stops driving.

The state changeover switch 340 drives the second gear 335 to the transmission position, such that the second gear 335 is disengaged from the rack 331, and the output shaft 333 is engaged with an engagement portion 361 of the lead screw 360. Thereafter, the motor 302 begins to drive the first gear 334, the second gear 335, and the output shaft 333 to rotate through its output shaft, thereby driving the selected lead screw 360 to rotate. The rotation of the lead screw 360 is converted into a linear motion of the drive block 362 threadedly engaged therewith, whereby the drive block 362 drives the desired mechanical linkage 170 to move linearly, thereby controlling a position of each rotatable wiper printed circuit boards 220, 220a of the phase shifter 200 above its respective main printed circuit board 210, 210a.

A base station antenna including a multi-RET actuator having a much smaller physical size than an existing multi-RET actuator is provided according to embodiments of the present disclosure. Since the motor is costly, the multi-RET actuator according to embodiments of the present disclosure may require only a single motor, thereby reducing the manufacturing cost. The multi-RET actuator according to embodiments of the present disclosure may transfer the power of a motor using a gear train having only two gears, thereby promoting the transmission efficiency. The multi-RET actuator according to embodiments of the present disclosure may have an extended design, such that the same motor and gear structure may be used to control any number (e.g., twelve) of mechanical linkages.

Exemplary embodiments of the multi-RET actuator according to the present invention have been described in detail above in combination with the accompanying drawings. Although in the present invention, the exemplary multi-RET actuator is used in the field of base station antennas, the multi-RET actuator of the present invention which is not limited thereto may be applied to any suitable field.

In addition, those skilled in the art should appreciate that a plurality of changes and modifications may be made to the exemplary embodiments of the present invention without departing from the spirit and scope of the present invention. Accordingly, all the changes and modifications are encompassed within the protection scope of the present invention as defined by the claims. The present invention is defined by the appended claims, and the equivalents of these claims are also contained therein.

That which is claimed is:

1. An actuator for multiple phase shifters comprising:
a motor;
a linkage drive system including a plurality of drive mechanisms for driving mechanical linkages of multiple phase shifters;
a linkage selection system that is configured to selectively connect the motor to a selected one of the drive mechanisms of the linkage drive system, the linkage selection system including:
a support seat having a length direction that is transverse to a length direction of the mechanical linkage;
a carrier disposed on the support seat and configured to carry the motor back and forth along a length direction of the support seat; and
a movement transmission mechanism that is configured to switch between a movement state in which the movement transmission mechanism is configured to move the carrier and the motor to a position where an output of the motor can engage the selected one of the driving mechanisms, and a transmission state in which the movement transmission mechanism transfers a rotational movement of the output of the motor to the selected one of the drive mechanisms.

2. The actuator according to claim 1, wherein the linkage selection system further includes a state changeover switch that is configured to switch the movement transmission mechanism between the movement state and the transmission state.

3. The actuator according to claim 2, wherein the state changeover switch is a solenoid valve or a motor.

4. The actuator according to claim 2, wherein the movement transmission mechanism includes a rack, a gear train that is configured to selectively mesh with the rack, and an output shaft of the movement transmission mechanism connected to the gear train.

5. The actuator according to claim 4, wherein the rack is fixed to the support seat and extends along a length direction of the support seat.

6. The actuator according to claim 4, wherein the gear train is mounted on one side of the carrier proximate the mechanical linkages, and the motor and the state changeover switch are mounted on another side of the carrier that is away from the mechanical linkages.

7. The actuator according to claim 4, wherein the gear train includes a first gear that is directly connected to an output shaft of the motor and a second gear that is directly connected to an output shaft of the state changeover switch, wherein the first gear and the second gear are directly engaged or are engaged through one or more intermediate gears.

8. The actuator according to claim 7, wherein the second gear remains engaged with both the first gear and the rack when the state changeover switch is in the movement state, and remains engaged with the first gear and disengaged from the rack when the state changeover switch is in the transmission state.

9. The actuator according to claim 7, wherein the first gear and the second gear are both spur gears.

10. The actuator according to claim 7, wherein the output shaft of the movement transmission mechanism is coaxially fixed to a center of the second gear.

11. The actuator according to claim 1, wherein the support seat includes one or more guide rods and a base that supports the guide rods.

12. The actuator according to claim 11, wherein the carrier spans the guide rod, and is configured for movement back and forth in a length direction of the support seat along the guide rod.

13. The actuator according to claim 10, wherein the base includes a bottom plate fixed to a substrate of the actuator, and projecting arms projecting upwardly from both ends of the bottom plate and supporting the guide rod.

14. The actuator according to claim 13, wherein the projecting arms support the guide rod above the substrate on both ends of the guide rod.

15. The actuator according to claim 4, wherein the linkage drive system includes a support seat and a plurality of lead screws supported on the support seat.

16. The actuator according to claim 15, wherein each lead screw is provided with a drive block for driving a reciprocal movement of the mechanical linkages, and each drive block is engaged with an external thread of a respective one of the lead screws by internal threads.

17. The actuator according to claim 15, wherein each lead screw is provided with a connection portion on an end facing the linkage selection system that is configured to connect with an output shaft of the linkage selection system.

18. The actuator according to claim 17, wherein the connection portion has a recess for receiving a top end of the output shaft of the linkage selection system, and the recess has a cross-sectional profile that matches a cross-sectional profile of the top end of the output shaft of the linkage selection system.

19. The actuator according to claim 2, wherein the actuator includes a controller that is configured to control operation of the motor and operation of the state changeover switch.

* * * * *